Nov. 19, 1935. G. W. HAYCOCK ET AL 2,021,550
AUTOMATIC CONTROL MECHANISM FOR VARIABLE SPEED GEAR BOXES
Filed Oct. 16, 1934 3 Sheets-Sheet 3

Inventors
George W. Haycock
and Duncan Campbell
by Wilkinson & Mawhinney
Attorneys.

Patented Nov. 19, 1935

2,021,550

UNITED STATES PATENT OFFICE 2,021,550

AUTOMATIC CONTROL MECHANISM FOR VARIABLE SPEED GEAR BOXES

George Wallace Haycock, Bankhead, Rutherglen, and Duncan Campbell, Glasgow, Scotland Application October 16, 1934, Serial No. 748,514
In Great Britain October 18, 1933

7 Claims. (Cl. 74—259)

This invention relates to a control mechanism for variable speed gear-boxes, which is automatic in its function of gear changing in so far as normal forward running conditions are concerned. For reversing and emergency duties a simple hand control is or may be included.

The principal object of the invention is to provide such a control mechanism which is actuated automatically in accordance with the torque transmitted by or imposed on the secondary or driven shaft of the gear-box whilst simultaneously providing in unison with the said mechanism, if desired, a simple means of effecting hand control of the gear-box for the purposes aforementioned.

The control mechanism consists essentially of a torque governor formed on the secondary shaft of the gear-box and suitably interconnected with a selector valve or switch. The said selector valve or switch selectively operates, through the medium of energized fluid or electrical energy, as the case may be, a series of operating cylinders or solenoids for engaging the gears of the gear-box; and the arrangement of the aforementioned essential components is such that selection of the appropriate gear ratio is automatically obtained by means of the torque governor imparting to the selector valve or switch the required displacement proportionate to the torque on the secondary shaft of the gear-box, that is, in the case of automotive vehicles the displacement proportionate to the load or resistance at the driving road wheels. Actual engagement of the selected gear ratio is produced by energized fluid or electrical energy acting on the gear operating cylinder or solenoid corresponding to the displacement of the aforesaid selector valve or switch.

A simple and effective means of providing manual control of the gear-box as an alternate method of changing gear to the automatic functioning described above is by means of an auxiliary valve or switch operating in conjunction with the automatically displaced valve or switch. Such an auxiliary valve or switch is operated by means of a simple hand mechanism and it is arranged in such a way that when not in use it permits unrestricted operation of the automatic control mechanism previously described and when in use it renders such automatic control inoperative and produces engagement of the gear ratio selected by hand by energized fluid or electrical energy in the manner aforementioned.

For gear operating purposes any convenient source of energy supply may be utilized, such as an oil or water pressure system; a compressed air system; a vacuum system, which may have its origin in the induction pipe of an internal combustion engine, an electrical generator, battery or accumulator, or a separate pump or electrical generator may be provided for such purpose.

In order that neutral position of the gear-box may be suitably obtained a centrifugal speed governor is provided for preference, on the primary or driving shaft of the gear-box in such a way that it is suitably interconnected to the selector valve or switch aforementioned. Such centrifugal speed governor moves the selector valve or switch into its normal working position when the driving engine or unit accelerates into its normal speed range and returns the said selector valve or switch to a neutral or inoperative position when the driving engine or unit decelerates to an idling speed or stops.

A spacing-mechanism, attached to or connected to the selector valve or switch to prevent the latter from remaining stationary in any position intermediate between the gear operating positions and a neutral catch, which may be interconnected to the accelerating pedal or control in such a way that the selector valve may be held in neutral position to permit free-wheeling are or may be provided in the control mechanism; and the aforementioned torque governor may be formed to constitute a fluid vibration damper in order to minimize the effect of torsional oscillations on the mechanism.

In order that our invention may be properly understood and readily carried into effect, we have hereunto appended three sheets of drawings of which:—

Figure 1a illustrates the remaining or left hand portion of said general arrangement of a control mechanism.

Figure 1:
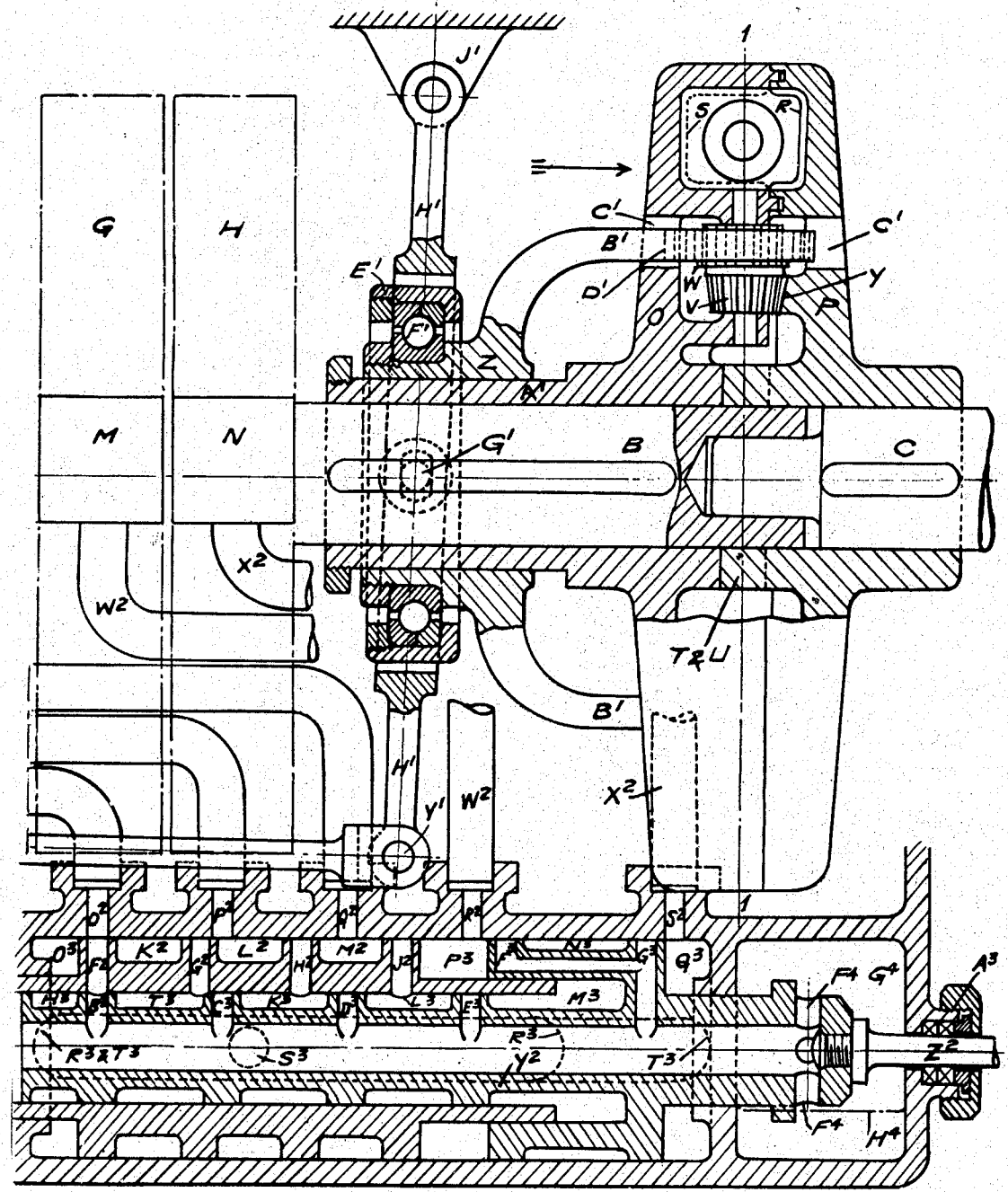
Figure 1 illustrates a longitudinal sectional view of the right hand portion of the general arrangement of a control mechanism suitable for application to a four-speed (with reverse gear) epicyclic gear-box and designed for fluid operation.
Figure 1:
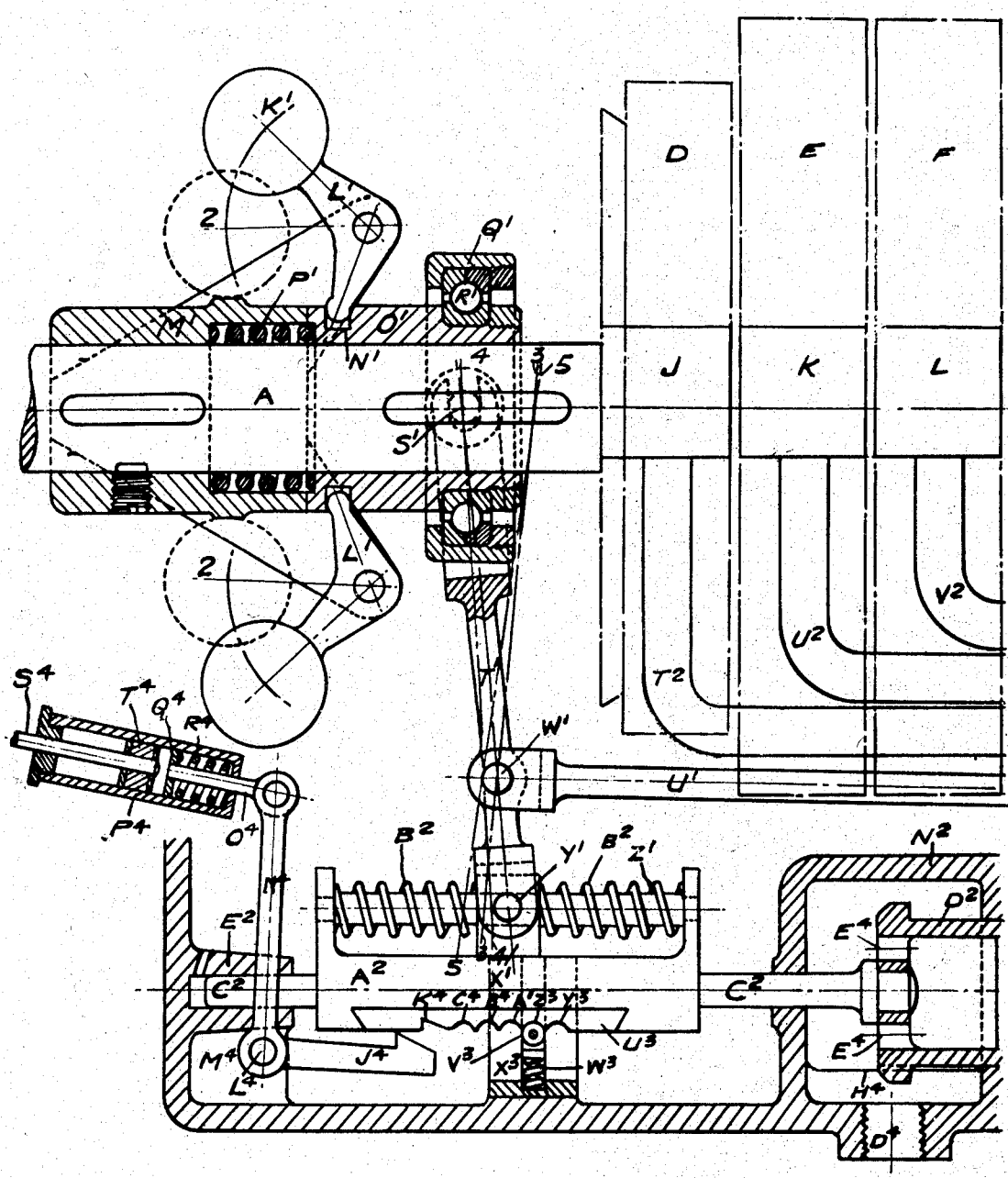
Figure 2:
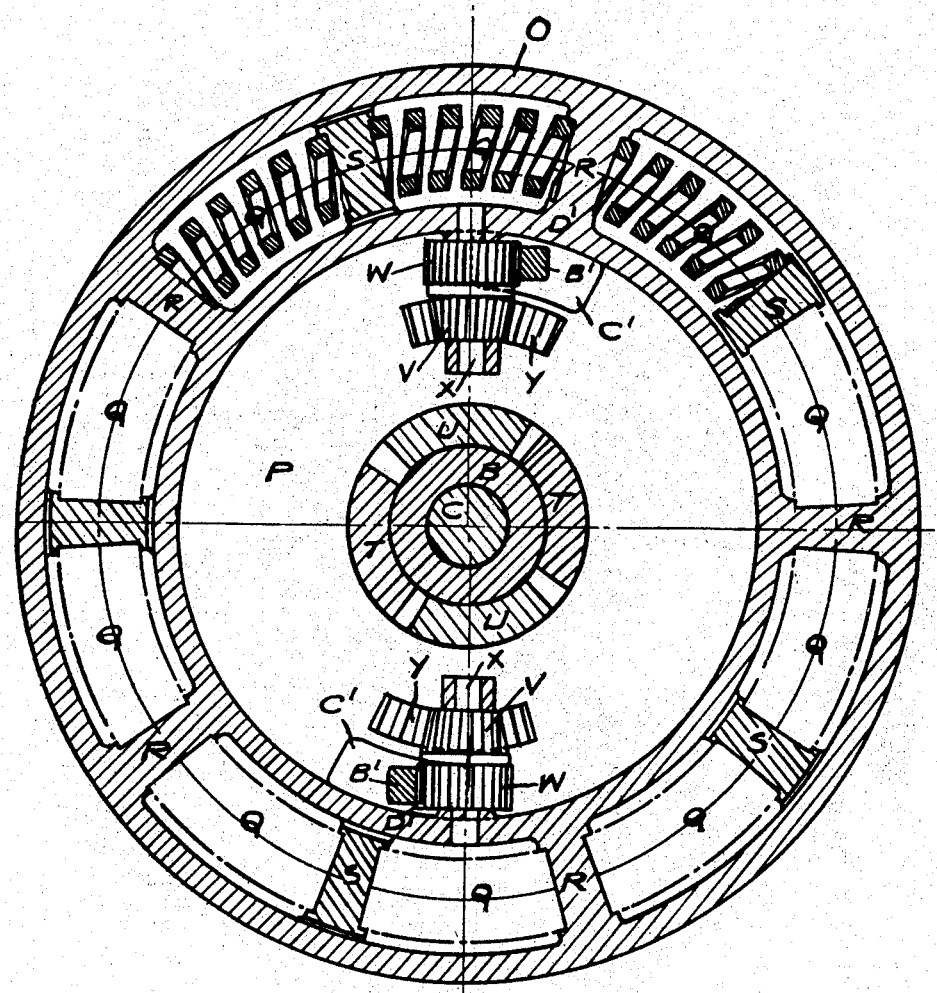
Figure 2 is a sectional end view of the torque governor shown in Figure 1, taken at the line I—I in the direction indicated by arrow.

According to our invention and referring to the drawings, A is the driving shaft of the gear-box and B and C are two adjacent and co-axial sections of the driven shaft. D is the friction clutch for engaging the 4th gear (top gear or direct drive) and E, F, G and H are the brake bands for engaging the 3rd, 2nd, 1st (bottom) and reverse gears respectively, as generally arranged in such a train of epicyclic gears. J, K, L, M and N are cylinders for operating the said members D, E, F, G and H respectively, and they may be of the plunger type well-known in engineering practice. The actions of the cylinders J, K, L, M and N referred to are transmitted to the respective members D, E, F, G and H by means of suitable lever or link devices and the return or disengaging strokes of the said cylinders may be accomplished simply by means of a spring device or devices in the manner hereinbefore described. O and P are the two members of a torque governor which are rigidly mounted in juxtaposition on the respective sections B and C of the driven shaft of the gear-box and which are interconnected by means of springs Q in such a manner that the torque imposed on the driven shaft is transmitted between the aforementioned members O and P through the medium of the said springs Q, thus producing in the latter a strain and between the said members O and P a consequent relative rotational movement proportional to such torque. The springs Q, previously referred to, are carried between, or mounted on, the webs R and S which are arranged alternately and which are formed in the torque governor members O and P respectively. In order to safeguard the mechanism against overstraining, whilst simultaneously allowing the flexibility required for satisfactory operation, the said members O and P are also provided with stop pieces T and U respectively, which are disposed in such a manner that the relative rotational movement between the members O and P as previously described is restricted to definite limits in respect of both directions of torque action. The necessity of such precautionary device, especially for reverse gear operation, will be readily understood from the further description hereinafter given. Bevel pinions V and spur pinions W, which are concentrically connected, are carried by the spindles X conveniently journalled in, for preference, the torque governor member O. Two such sets of pinions V and W, at diametrically opposite positions in the torque governor, are indicated in the drawings appended. The said bevel pinions V engage suitable teeth Y formed in the other torque governor member P in such a manner that the relative rotational movement of the aforementioned members O and P of the torque governor causes a corresponding rotation of the pinions V and W about their spindles X. A sleeve Z, which can slide axially on the extended portion $A^1$ of the member O, carries arms $B^1$, such arms projecting through suitable apertures $C^1$ in the members O and P and having teeth $D^1$ formed in them to engage with the aforementioned spur pinions W, in the manner of a rack and pinion mechanism, so that rotation of the said spur pinions W about their spindles X causes the sleeve Z to move axially, the extent of such movement or displacement being therefore proportional to the torque transmitted by or imposed on the driven shaft B and C of the gear-box. A collar $E^1$ is mounted, by means of a ball-bearing $F^1$, on the said sliding sleeve Z in such a manner that it is non-rotational and is connected by pins $G^1$ to a lever $H^1$ which has its fulcrum $J^1$ on the gear-box casting or other convenient member. The compartments of the torque governor, formed between the aforementioned members O and P for the purpose of accommodating the springs Q in the manner hereinbefore described are designed in such a way that they may be packed with grease or other suitable substance thus causing the webs R and S, previously referred to, to function as plungers and giving to the torque governor an action similar to that of a dashpot or damper. Such damping action of the aforementioned torque governor minimizes the effect of torsional vibrations and momentary fluctuations of torque transmitted on the control mechanism.

A centrifugal speed governor, of a type well-known in engineering practice, is shown in Figure 1 of the accompanying drawings as mounted on the driving shaft A of the gear-box. Such governor consists essentially of, for preference, two balls or weights $K^1$ each mounted on a bell-crank lever $L^1$ which is carried by the member $M^1$ rigidly fixed to the driving shaft A. The said bell-crank levers $L^1$ act in slots $N^1$ formed in a rotating but axially displaceable sleeve or member $O^1$ in such a manner that outward movement of the aforementioned balls $K^1$ under centrifugal force produces axial displacement of the sleeve $O^1$ against the action of the helical spring $P^1$ which is interposed between the said member $M^1$ and sleeve $O^1$. A collar $Q^1$ is mounted, by means of a ball-bearing $R^1$, on the afore-described sleeve $O^1$ in such a manner that it is non-rotational and is connected by means of pins $S^1$ to a lever $T^1$, such pins $S^1$ constituting a fulcrum for the said lever $T^1$, which is movable in accordance with the action of the centrifugal speed governor. A link $U^1$ interconnects the lever $H^1$ from the torque governor as hereinbefore described and the lever $T^1$ from the centrifugal speed governor at the pivot pins $V^1$ and $W^1$ respectively, and the said lever $T^1$ is connected at its extremity to a crosshead $X^1$ by means of a pin $Y^1$, the arrangement being such that the position of, or displacement given to, the crosshead $X^1$ referred to varies with the individual or combined actions of the aforedescribed torque governor and centrifugal speed governor. The crosshead $X^1$, as above, is carried by a slide bar or member $Z^1$ of a guide piece $A^2$ in such a manner that it is capable of sliding along the same, the extent of such sliding movement being, however, suitably restricted by means of springs $B^2$. The guide piece $A^2$ is connected by means of a spindle $C^2$ to a selector valve $D^2$ and the outer end of such spindle $C^2$ is supported in a guide $E^2$ conveniently formed in the gear-box casting.

The selector valve $D^2$ referred to above has a number of ports $F^2$, $G^2$, $H^2$, and $J^2$, which correspond with the number of operating cylinders J, K, L and M respectively for the forward running gears, and a series of annular spaces $K^2$, $L^2$, and $M^2$ arranged between the said ports for the outflow of discharged fluid. The said selector valve $D^2$ slides, under the actuation of the aforementioned spindle $C^2$, inside a valve chest $N^2$ which is formed integrally with the gear-box casting and which has a number of ports $O^2$, $P^2$, $Q^2$, $R^2$, and $S^2$, respectively connected by means of pipes, $T^2$, $U^2$, $V^2$, $W^2$, and $X^2$ to the gear operating cylinders J, K, L, M and N. An auxiliary valve $Y^2$, which is hand-operated by means of a simple control (not shown in the accompanying drawings) is actuated by means of the spindle $Z^2$ passing through the stuffing-box $A^3$ formed in the valve chest $N^2$ and slides inside the said valve chest $N^2$ and selector valve $D^2$. Such auxiliary valve $Y^2$ has ports $B^3$, $C^3$, $D^3$, and $E^3$ which are disposed in such a way that, when the valve is in its normal or inoperative position, they are directly opposite to the ports $O^2$, $P^2$, $Q^2$ and $R^2$ respectively of the aforementioned valve chest $N^2$, and ports $F^3$ and $G^3$ arranged adjacent to the ports $R^2$ and $S^2$ of the said valve chest. Annular spaces $H^3$, $J^3$, $K^3$, $L^3$, $M^3$, and $N^3$, arranged for the outflow of discharged fluid, are also formed between the ports of the auxiliary valve $Y^2$, and the interstices $O^3$, $P^3$, and $Q^3$, formed between the valve chest $N^2$, selector valve $D^2$ and said auxiliary valve $Y^2$ also constitute outlets for discharged fluid. In order that fluid discharged from the gear operating cylinders shall not be entrained in any of the interstices of the valve mechanism hereinbefore described but shall have an unrestricted flow to the sump, situated for convenience in the bottom of the gear-box casting, the aforementioned annular spaces $H^3$, $J^3$, $K^3$, $L^3$ and $M^3$ of the auxiliary valve $Y^2$ are interconnected by a longitudinal groove or channel $R^3$, the fluid from which passes through a hole $S^3$ in the selector valve $D^2$ and thence through a longitudinal slot $T^3$ in the valve chest $N^2$ to the sump referred to. The said groove $R^3$, hole $S^3$ and slot $T^3$, which are indicated in dotted lines in Figure 1 of the accompanying drawings, are in line with each other and are preferably at a position circumferentially remote from the ports of the selector and auxiliary valves $D^2$ and $Y^2$ respectively. In order to give the required operating positions of the selector valve $D^2$ previously described a valve spacing mechanism, comprising a suitably notched plate $U^3$ secured to the aforementioned guide piece $A^2$ and against which bears a roller $V^3$, loaded by a spring $W^3$ and carried by the member $X^3$ attached to the gear-box casting, is provided, and the arrangement of the same is such that when the above mentioned roller $V^3$ is bearing in the notch $Y^3$ of the notched plate $U^3$ the selector valve $D^2$ is in a position to the left of that indicated in the drawings (Figure 1) whereby the ports $F^2$, $G^2$, $H^2$, and $J^2$ are closed to the pressure fluid by the auxiliary valve $Y^2$ (in its normal position) and are also closed by the valve chest $N^2$. When the said roller $V^3$ is in the notch $Z^3$ of the notched plate $U^3$ the port $F^2$ of the selector valve $D^2$ coincides with the port $O^2$ of the valve chest $N^2$: Figure 1 of the accompanying drawings indicates the control mechanism in such a position. Similarly when the roller $V^3$ as above is respectively in the notches $A^4$, $B^4$, and $C^4$ the corresponding positions of the said selector valve $D^2$ are such that the ports $G^2$ and $P^2$ of the selector valve $D^2$ and valve chest $N^2$ respectively coincide, ports $H^2$ and $Q^2$ coincide, and ports $J^2$ and $R^2$ coincide. The pressure fluid enters the valve chest $N^2$ from a suitable connection (not shown) secured at $D^4$ and passes to the interior of the aforementioned selector valve $D^2$ and auxiliary valve $Y^2$ through apertures $E^4$ in the outer end of the former. In order to eliminate hydraulic end thrust from the said auxiliary valve $Y^2$ similar apertures $F^4$ are formed in the outer end of the same, which allow the pressure fluid to fill the chamber $G^4$ of the valve chest $N^2$. Feather pieces or webs $H^4$ are formed in, or attached to, the valve chest $N^2$ in such a manner that, being accommodated by suitable slots in the outer ends of the aforementioned selector valve $D^2$ and auxiliary valve $Y^2$ they prevent these latter from rotating and thus maintain the ports of the said valves and valve chest in proper alignment.

A neutral catch $J^4$ is also incorporated in the control mechanism for the purposes of allowing free-engine running (i. e. the rotation of the driving shaft A without engagement of any gears) and free-wheeling of the vehicle or driven unit, in the manner hereinafter described. The said neutral catch $J^4$ is arranged to engage with a suitable notch $K^4$ formed in the aforementioned notched plate $U^3$, such engagement occurring when the roller $V^3$ is in the notch $Y^3$ and the selector valve $D^2$ is in its neutral position, or position of no gear engagement, as hereinbefore described. A spindle $L^4$, which is journalled in the part $M^4$ formed in the gear-box casting, carries the said neutral catch $J^4$ and a lever $N^4$ in the manner of a bell-crank lever, the lever $N^4$ being connected to a rod $O^4$ which enters a cylinder $P^4$. A washer $Q^4$, attached to the end of the aforementioned rod $O^4$ and contained in the cylinder $P^4$, constrains a helical spring $R^4$ between itself and the end of the said cylinder $P^4$; and a rod $S^4$, which is connected to the accelerator pedal or mechanism of the driving engine or unit, carries a friction plunger $T^4$ also contained inside the said cylinder $P^4$. The arrangement of the foregoing is such that, when the accelerator pedal is released for stopping, slowing or freewheeling, the consequent pulling action of the rod $S^4$, through the medium of the frictional resistance between the plunger $T^4$ and the cylinder $P^4$, causes compression in the spring $R^4$ which is sufficient to enable the neutral catch $J^4$ to engage the notch $K^4$, previously referred to, whenever the selector valve $D^2$ attains its neutral position. This neutral position of the selector valve $D^2$ is maintained until such time as the accelerator pedal is depressed, when, due to the reverse motion of the aforementioned rod $S^4$ acting through the said frictional medium, the neutral catch $J^4$ is disengaged and the selector valve $D^2$ thus becomes free to assume its appropriate working position.

The action of the aforedescribed control mechanism, under its various working conditions and as applied, for example, to automobiles, is as follows:—

When the engine and the driving shaft A are at rest the balls $K^1$ of the centrifugal speed governor are in the position indicated by dotted lines at 2—2 in Figure 1 of the accompanying drawings, and, there being no torque imposed on the torque governor, the configuration of the said torque governor, lever $H^1$ and link $U^1$ are as shown in the above-mentioned Figure 1. Therefore the position of the lever $T^1$ from the centrifugal speed governor is as indicated by the centre-line 3—3 and the roller $V^3$ previously described is in notch $Y^3$ of the notched plate $U^3$, i. e. the selector valve $D^2$ is in its neutral position. Under these circumstances the neutral catch $J^4$ is, as hereinbefore explained, in engagement with the notch $K^4$, and when the engine is started it may be run free of the transmission to any speed by means of the hand throttle-control, the effect of the centrifugal speed governor being simply to strain the springs $B^2$. Whenever the accelerator pedal is depressed, however, the said neutral catch $J^4$ is disengaged and under the action of the said springs $B^2$ the resistance of the roller $V^3$ is overcome to a sufficient extent to allow the selector valve $D^2$ to move into its operating position, whereby, the notch $Z^3$ becomes engaged by the aforementioned roller $V^3$ and the ports $F^2$ and $O^2$ of the selector valve $D^2$ and valve chest $N^2$ respectively coincide and allow the access of pressure fluid to the operating cylinder J of the 4th or top set of gears. The engagement of this set of gears causes a rise in engine torque, which, acting through the torque governor in the aforedescribed manner produces an additional strain in the springs $B^2$ sufficient to cause the resistance of the aforementioned roller $V^3$ to be again overcome, when the selector valve $D^2$ moves further to engage the 3rd set of gears, i. e., the notch $A^4$ engages the said roller $V^3$, ports $G^3$ and $P^3$ coincide and the pressure fluid operates the corresponding cylinder K. Simultaneously with the engaging of the said 3rd set of gears the aforesaid 4th set of gears is disengaged, since the fluid in the cylinder J is free to discharge, through the port $O^2$ of the valve chest $N^2$, the interstice $O^3$ and the slot $T^3$ in the valve chest $N^2$, to the sump previously referred to, such disengagement being assisted by means of the spring device or devices hereinbefore referred to. The foregoing sequence of actions is, or may be, continued to engage 2nd or 1st sets of gears, as may be required to transmit the torque in the driven shaft B and C necessary for starting and accelerating the automobile. For 2nd gear the notch $B^4$ of the notched plate $U^3$ is constrained to engage with the roller $V^3$ and the ports $H^2$ and $Q^2$ of the selector valve $D^2$ and valve chest $N^2$ respectively coincide, thus allowing access of the pressure fluid to the operating cylinder L; and for 1st gear the notch $C^4$ is constrained to engage with the roller $V^3$ and the ports $J^2$ and $R^2$ coincide allowing access of the pressure fluid to the cylinder M. Thereafter the action of the control mechanism during normal forward running is simply that when the torque in the driven shaft B and C increases to such an extent as to be outside the designed range of the operating set of gears the springs $B^2$ of the guide piece $A^2$ are strained by the torque governor and interconnecting mechanism as hereinbefore described to a degree whereby the resistance of the roller $V^3$ to the engaged notch of the notched plate $U^3$ is overcome and the selector valve $D^2$ moves to the adjacent position for engaging the next and lower set of gears in the manner previously shown, and conversely, when the torque transmitted by the said driven shaft A and B decreases beyond the designed range of the set of gears in operation, the selector valve similarly effects engagement of the adjacent and higher set of gears. To obtain freewheeling effect the accelerator pedal is released and the engine and driving shaft A slow down, thus causing the vehicle to over-run the engine, and producing a momentary reversal of torque in the driven shaft A and B and a consequent reversal of the action of the torque governor, which latter constrains the lever $T^1$ from the centrifugal speed governor to the position indicated by the centre line 4—4 in Figure 1 of the accompanying drawings if the engine is running within its working speed range; or to the position indicated by the centre line 5—5 if the engine is idling or stopped. In any case, however, the strain imposed on the springs $B^2$ causes the selector valve $D^2$ to move to its neutral position and, the neutral catch $J^4$ engaging with the notch $K^4$ in the manner previously described, to be retained in such position until the accelerator pedal is again depressed. For reverse gear operation the aforedescribed auxiliary valve $Y^2$ is moved by means of the simple hand control previously referred to to occupy a position whereby the port $G^3$ of the said auxiliary valve coincides with the port $S^2$ of the valve chest $N^2$ thus permitting the access of pressure fluid to the operating cylinder N; and in order to use the engine for braking purposes the auxiliary valve $Y^2$ is moved until the ports $F^3$ and $R^3$ of the said auxiliary valve $Y^2$ and valve chest $N^2$ respectively coincide, when the pressure fluid similarly operates the cylinder M, thus engaging the 1st set of gears. Since the operations of reversing and braking by means of the engine, as described above, entail a reversal of torque in the driven shaft A and B and in the torque governor, and since the torque magnifications of the sets of gears used for such purposes are generally of a high order, the stop pieces T and U, which, as aforedescribed, are incorporated in the said torque governor are necessary in order to safeguard the mechanism in general by limiting the strain imposed on the springs $B^2$ of the guide piece $A^2$. As will be seen from the accompanying drawings, it is impossible for two sets of gears to be in simultaneous engagement and, whatever operation takes place in the mechanism, the fluid from the cylinders of the disengaged sets of gears is always free to drain to the sump in the manner hereinbefore described.

Having now particularly described and ascertained the nature of our said invention and in what manner the same is to be performed, we declare that what we claim is:—

1. Automatic control mechanism for variable speed gear-boxes, comprising a torque governor, a driven shaft for the gear-box having two coaxial sections, such torque governor consisting essentially of two juxtaposed members, each of which is rigidly secured to a section of the aforesaid driven shaft; yielding means for interconnecting the said governor members in such a manner that the torque transmitted by the driven shaft is simultaneously transmitted between the said members, causing a strain in the yielding means and a consequent relative rotational movement between the said members proportional in extent to the torque transmitted; a sliding sleeve mounted on one of the aforesaid members; gearing connected to the said sliding sleeve and interconnecting the said members whereby the relative rotation of the latter imparts a proportionate axial displacement to the aforesaid sliding sleeve; and a selector valve which operates inside a valve body and interconnected to the aforesaid sliding sleeve of the torque governor in such a way that it is actuated in accordance with the relative rotational movement of the members of the torque governor, the said selector valve having a series of ports for the guidance of energized fluid and the said valve body having a series of similar ports connected to a corresponding series of fluid pressure cylinders for engaging the gears of the gear-box in a manner whereby the gear of speed ratio appropriate to the torque transmitted is engaged on account of the operation by energized fluid of the corresponding fluid pressure cylinder.

2. Automatic control mechanism for variable speed gear-boxes, as in claim 1, characterized in the provision of a centrifugal speed governor which is mounted on, and rotates with, the driving shaft of the gear-box which rotates at a speed directly proportional to the speed of the driving engine or unit and is interconnected to the aforedescribed torque governor and selector valve in such a way that, as the driving engine or unit accelerates to its normal working speed range the said centrifugal speed governor moves the selector valve into its operating position and conversely, as the driving engine or unit decelerates to an idling speed or stops the centrifugal speed governor moves the selector valve to its neutral or inoperative position.

3. Automatic control mechanism for variable speed gear-boxes, as in claim 1, characterized in the provision of an auxiliary valve which may be hand operated through the medium of any suitable device and which has for its object the engagement of reverse gear, and of a forward set or sets of gears for engine breaking and emergency functions; the said auxiliary valve being arranged to operate in conjunction with the aforementioned selector valve and valve body and having a series of ports disposed in such a way that, by suitably moving the auxiliary valve, the said series of ports permits the required flow of energized fluid to and from the aforementioned fluid pressure cylinders in order to engage reverse gear, 1st forward gear and whichever set of gears may be required for such like purpose; and the said auxiliary valve being arranged in such a manner that, when in use, it renders the aforementioned selector valve inoperative, but conversely, when not in use, it does not obstruct the normal action of the said selector valve.

4. Automatic control mechanism for variable speed gear-boxes, as in claim 1, characterized in the provision of a spacing mechanism, which is connected to the aforementioned selector valve in such a manner that the said selector valve moves instantaneously from one operating position to the adjacent operating position under the individual or combined actions of the torque governor and centrifugal speed governor aforementioned.

5. Automatic control mechanism for variable speed gear-boxes, as in claim 1, characterized in the provision of a neutral catch which has for its object the permitting of running of the driving engine free of power transmission, and also of free-wheel effect, and which is connected to the accelerator pedal or mechanism in such a manner that when the said accelerator pedal is released for slowing or stopping the driving engine the said neutral catch is constrained to engage a suitable notch formed in the aforementioned selector valve whenever the said selector valve attains its neutral position and position of no gear engagement; and conversely, when the accelerator pedal is depressed for engine acceleration the said neutral catch is rendered free of such engaging notch, thus enabling the aforesaid selector valve to move to its normal working position.

6. Automatic control mechanism for variable speed gear boxes, as in claim 1, characterized in so forming the juxtaposed members of the torque governor that, when grease or other suitable substance is contained between them, they function in the manner of a dashpot or vibration damper and relieve the said control mechanism from the effect of torsional vibrations and momentary fluctuations in torque.

7. Automatic control mechanism for variable speed gear-boxes, as in claim 1, characterized in so forming the juxtaposed members of the torque governor that relative rotational movement between them is restricted to suitable limits, having regard to both directions of torque application, in order to safeguard the said control mechanism against overstrain.

GEORGE WALLACE HAYCOCK.
DUNCAN CAMPBELL.